United States Patent [19]

Matsumoto

[11] Patent Number: 4,825,429
[45] Date of Patent: Apr. 25, 1989

[54] RECORDING MEDIUM DRIVING DEVICE

[75] Inventor: Yukio Matsumoto, Furukawa, Japan

[73] Assignee: Alps Electric Co., Ltd, Japan

[21] Appl. No.: 5,574

[22] Filed: Jan. 16, 1987

[30] Foreign Application Priority Data

Mar. 12, 1986 [JP] Japan .............................. 61-34660[U]

[51] Int. Cl.⁴ .......................... G11B 1/00; G11B 25/04
[52] U.S. Cl. ................................................... 369/75.2
[58] Field of Search ....................................... 369/75.2

[56] References Cited

U.S. PATENT DOCUMENTS

| 4,564,930 | 1/1986 | Funabashi et al. | 369/75.2 |
| 4,631,716 | 12/1986 | Ikedo et al. | 369/75.2 |
| 4,653,039 | 3/1987 | Ueno et al. | 369/75.2 |
| 4,697,259 | 9/1987 | Takanashi | 369/75.2 |

Primary Examiner—Steven L. Stephan
Attorney, Agent, or Firm—Guy W. Shoup; Paul J. Winters; Norman R. Klivans

[57] ABSTRACT

A recording medium driving device is disclosed. The recording medium driving device is equipped with a tray on which an information recording medium is mounted, a rack interlocking with the tray, and a tray moving means inclusive of gears each engaging with the rack. This driving device effects the recording and/or the reproduction by loading the information recording medium on a medium driving means. The driving device further has a locking member for locking the rack to the tray and for intergrally moving both of them to a loading position of the information recording medium for the medium driving means; and a guide groove for guiding the lock member to a position at which the locking state is released after reaching the loading position. With this construction, it is feasible to reduce an optical disk driving device in thickness and to prevent it from suffering damages caused by malfunctions.

5 Claims, 18 Drawing Sheets

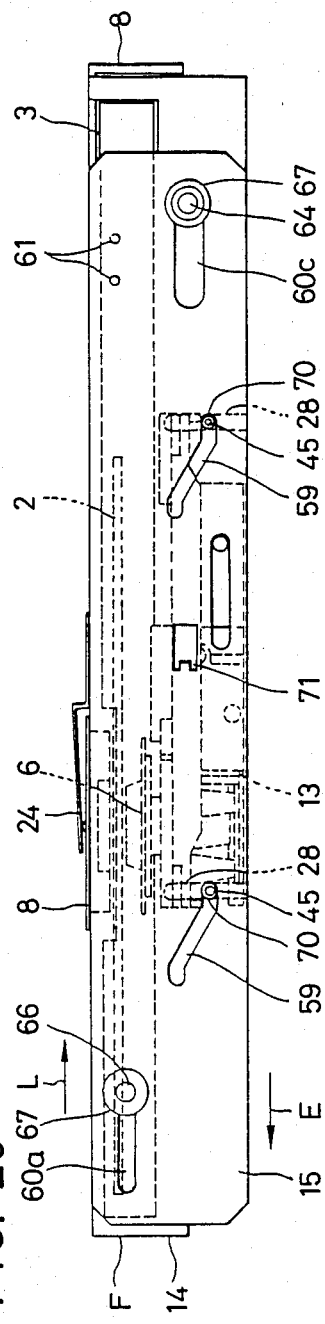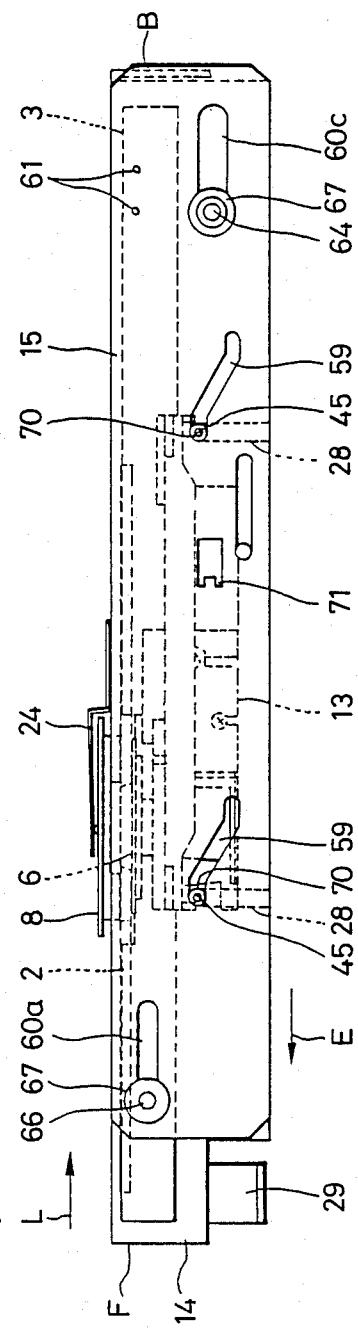

RECORDING MEDIUM DRIVING DEVICE

BACKGROUND OF THE INVENTION

1. Field of the Invention:

The present invention relates to a recording medium driving device which is classified as a so-called front loading type wherein an information recording medium is mounted on a mounting member jutting out toward the front surface of a device body, and more particulary, to a recording medium driving device suitable for an optical disk driving device.

2. Description of the Prior Art:

In an optical disk driving device, there is broadly adopted a method in which an optical disk is mounted on a tray that is protrudent toward the front surface of a device body, and the optical disk is led into the device body together with the tray so as to effect the recording and the reproduction. As one example, the present applicant disclosed an invention in the specification of Japanese Patent Application No. 23990/1985.

The outline of a conventional optical disk driving device relative to the above-described invention will hereinafter be described with reference to the accompanying drawings.

In FIGS. 26 to 29 inclusive, the optical disk driving device substantially consists of: a chasis 101; a covering member 103 equipped with a clamper 102 and axially so supported as to be rotatable round the chassis 101; a tray 104 mounted with an optical disk; and a tray driving mechanism 105 for leading the tray to the chasis 101 and arranging for the tray 104 to jut out from the chasis 101.

The tray driving mechanism 105 is constituted by: a gear train 107 engaging with a rack 106 which moves integrally with the tray 104; and a motor by which to drive the gear train 107, this tray driving mechanism 105 being provided on the side of feeding out the tray beneath the chassis 101. Freely rotatable rollers 108, 109 are axially supported by the rack 106. The externally disposed roller 109 is arranged to roll on the upper surface of the covering member 103. A supporting spindle 110 which axially and rotatably retains the rollers 108, 109 is attached to the above-mentioned rack 106 so that the supporting spindle is movable within a slot 111 formed in the side surface of the tray 104, this supporting spindle 110 being always so biased as to approach the center of the tray 104 by dint of a spring 112.

With this arrangement, when the motor, as illustrated in FIG. 26, rotates from a state in which the tray 104 is rendered protrudent (an inject-state) in the direction of load, the rack, as shown in FIG. 27, moves in the direction indicated by an arrowhead D, and the tray 104 also moves in the same direction indicated by the arrowhead D by dint of the spring 112. When the tray 104 is led to a loading position shown in FIG. 28, the tray 104 impinges upon a predetermined position of the chassis 101 and is hindered from moving in the direction of the arrowhead D. As a result, the rack 106 alone moves in the direction pointed by the arrowhead D, resisting a resilient force of the spring 112. In this process, the covering member 103 descends along the slope of a cam groove 113, and the descent of the covering member 103 is completed just when the above-described supporting spindle 110 reaches the end portion of the slot 111. At this time, an optical disk 114 is clamped between the clamper 102 and a turn table 115, thereby effecting a loading operation of the optical disk with respect to the turn table 115.

At the inject-time, the tray 104 is made to project by the above-described steps in the reversed order. After completing the protorusion of the tray, the optical disk 114 can be taken up from the tray 104.

In the thus constituted optical disk driving device, the rack 106 and the tray 104 are arranged to be integrally movable only by the resilient force of the spring 112. Hence, if the user holds the tray 104 or pulls the tray 104 out in the course of leading the tray 104 into the device body, the rack 106 alone reaches a predetermined position in spite of the fact that the tray 104 does not yet arrive at the predetermined position, this probably casuing such a malfunction that the clamper 102 is lowered.

SUMMARY OF THE INVENTION

Accordingly, it is a primary object of the present invention which is made in the light of the circumstances relative to the prior art to provide a recording medium driving device which is constituted such that a tray and a rack integrally move to a preset position, and after reaching the preset position, the rack alone moves separately from the tray in order to perform predetermined operations, and is further characterized such that there is no probability to cause a malfunction in which the rack is separated therefrom by an unintended manipulation or the like before the rack and the tray reach the predetermined position.

To this end, according to one aspect of the invention, there is provided a recording medium driving device which comprises: a tray loaded with an information recording medium; a rack interlocking with the tray; and a means for driving the tray which means subsumes gears each engaging with the rack, this recoding medium driving device performing the recording or the reproduction by leading the tray protruding outside the device body into the same body and by loading the information recording medium on a medium driving means.

According to another aspect of the invention, there is provided a recording medium driving device which includes: a lock member for locking the rack to the tray and integrally moving them to a loading position for the memdium driving means; and a guide groove for guiding the lock member to the loading position and at the same time guiding the lock member to a position at which the locking of the rack is completely released after reaching the loading position.

According to the above-described means, before the tray reaches a preset position on the medium driving means such as, for instance, a turn table, the guide groove is formed so that the lock member alone deviates from the direction in which the tray is led. The tray and the rack are integrally led along the guide groove into the recording reproducing device body by virtue of the function of the lock member. When the tray arrives at the preset position on the medium driving means, a state in which the rack and the tray are fixed to each other by the lock member is arranged to be released, the rack alone moves from the foregoing position separately from the tray. It is further feasible to carry out the next operation while maintaining the tray at the loading position in accordance with the movement of the rack.

These and other objects, features and advantages of the invention will become apparent to those skilled in the art on reading the following detailed description with reference to the accompanying drawings.

BRIEF DESCRIPTION OF THE DRAWINGS

FIGS. 1 to 25 in combination show an embodiment of the present invention.

FIG. 1 is a plan view of an optical disk driving device when a loading operation is completed;

FIG. 2 is a bottom plan view of the same device;

FIG. 3 is a front view thereof;

FIG. 4 is a front view of the optical disk driving device, showing a state wherein a tray is at the loading position, while a small frame is at the unloading position;

FIG. 5 is a side view of the optical disk driving device when the loading is completed;

FIG. 6 is a plan view showing the principal portion of the small frame;

FIG. 7 is a side view thereof;

FIG. 8 is a plan view of a side base;

FIG. 9 is a front view thereof;

FIG. 10 is a plan view of a chassis;

FIG. 11 is a front view thereof;

FIG. 12 is a side view thereof;

FIG. 13 is a plan view of the tray;

FIG. 14 is a sectional view taken substantially along the line A—A of FIG. 13;

FIG. 15 is a front view of a lock pin;

FIGS. 16 to 20 inclusive are views each showing a lead-in operation of the tray;

FIGS. 21 to 25 inclusive are views each showing an operation of a motor unit;

DETAILED DESCRIPTION OF THE PREFERRED EMBODIMENT

Figure 1:
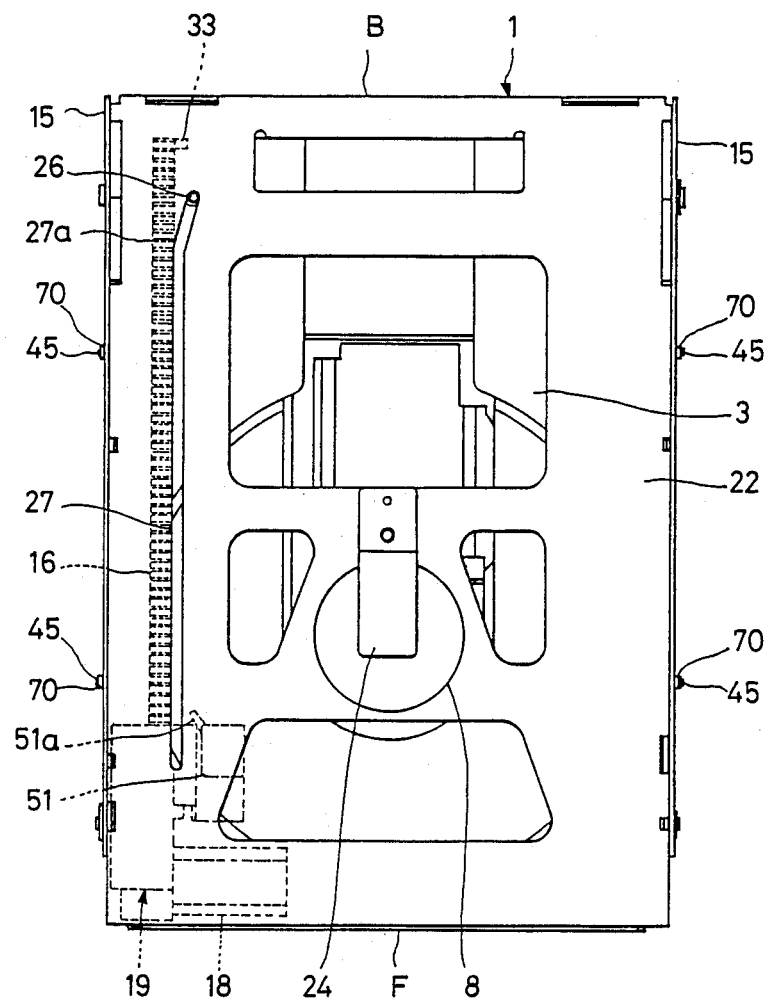
Figure 2:
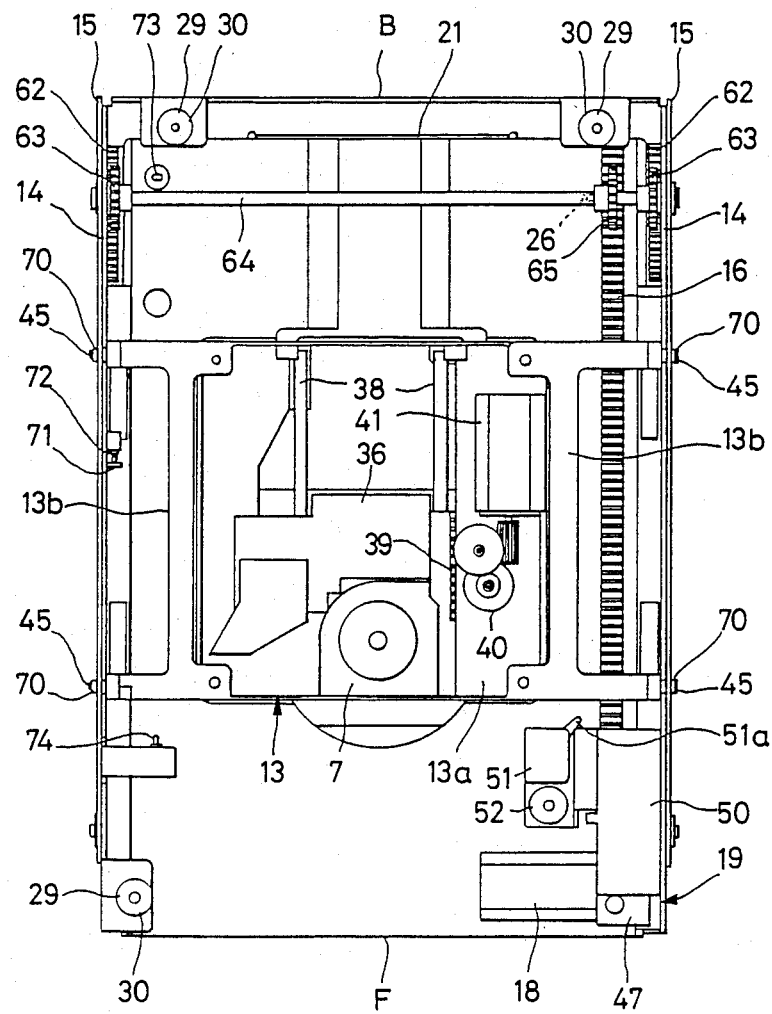
Figure 3:
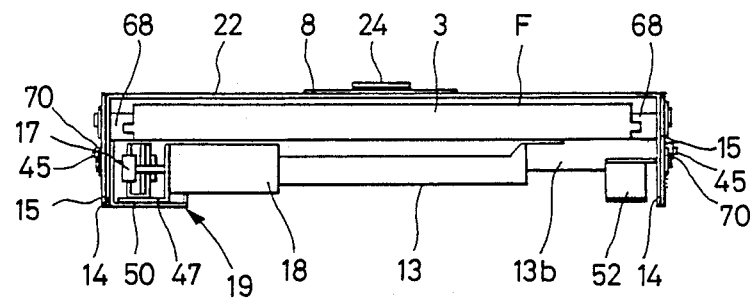
Figure 4:
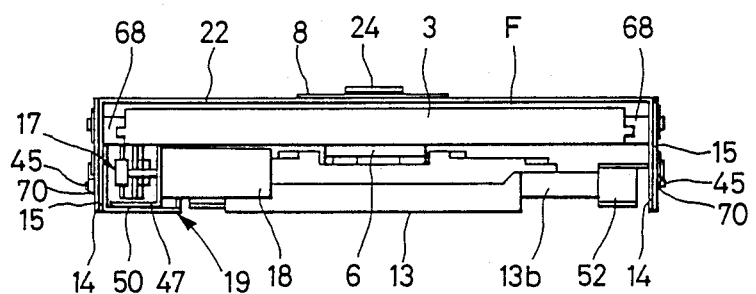
Figure 6:
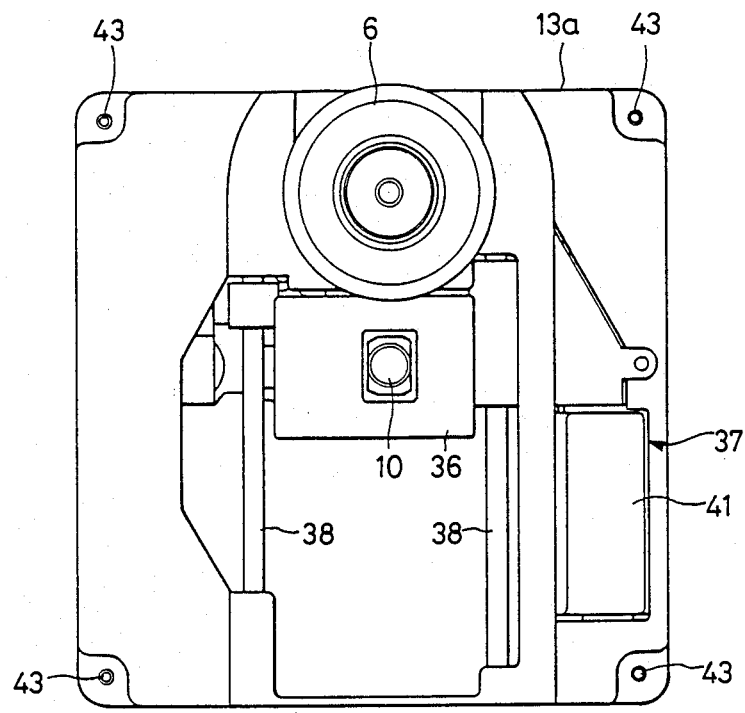
Figure 7:
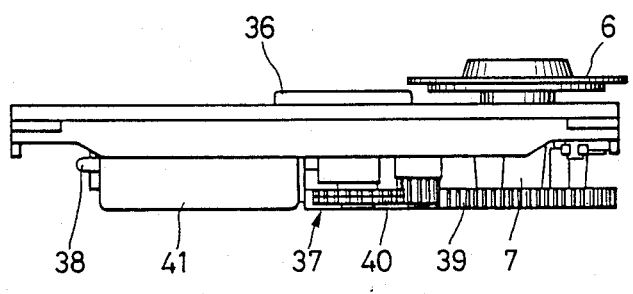
Figure 8:
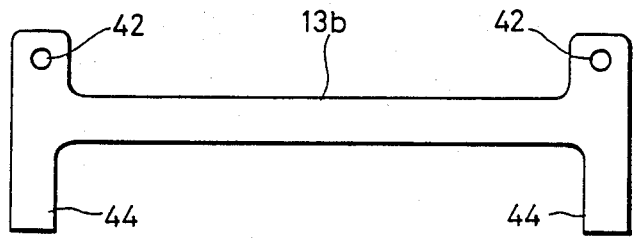
Figure 9:
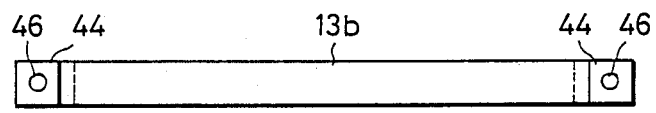
Figure 10:
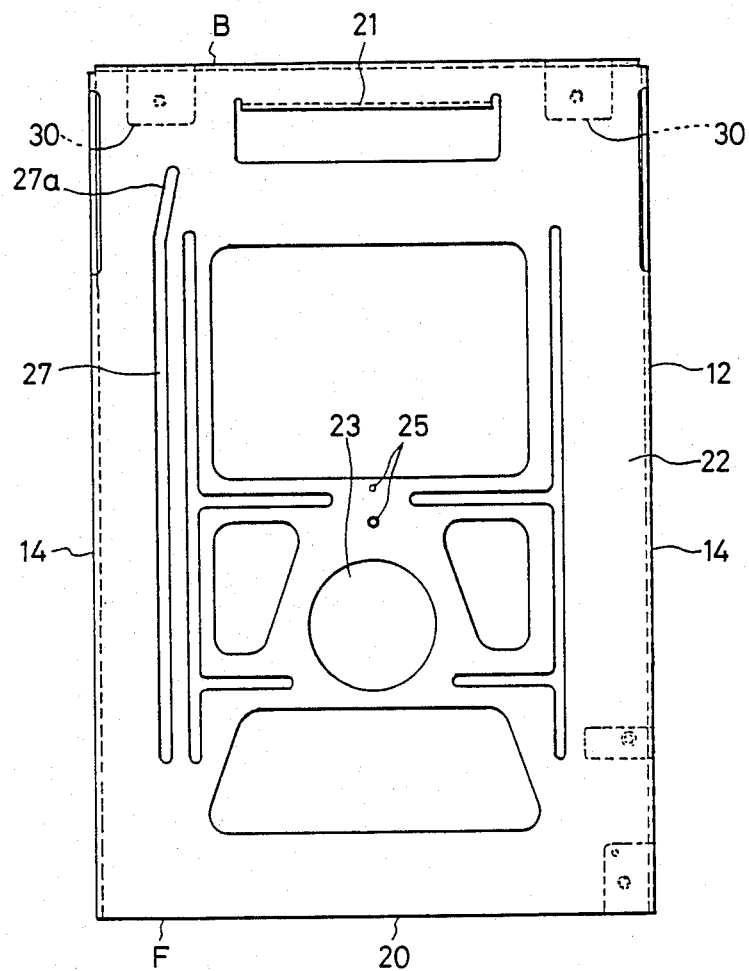
Figure 11:
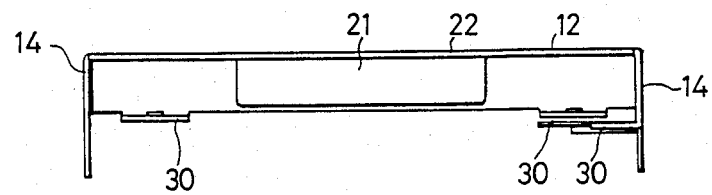
Figure 12:
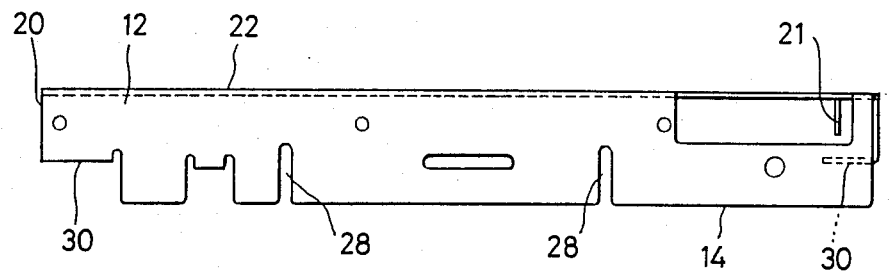
Figure 15:
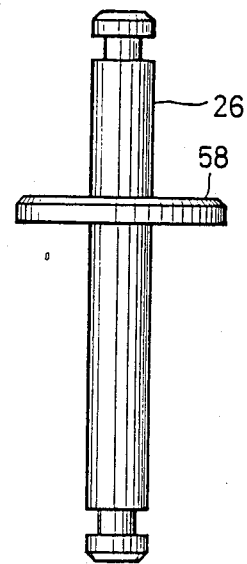
Figure 13:
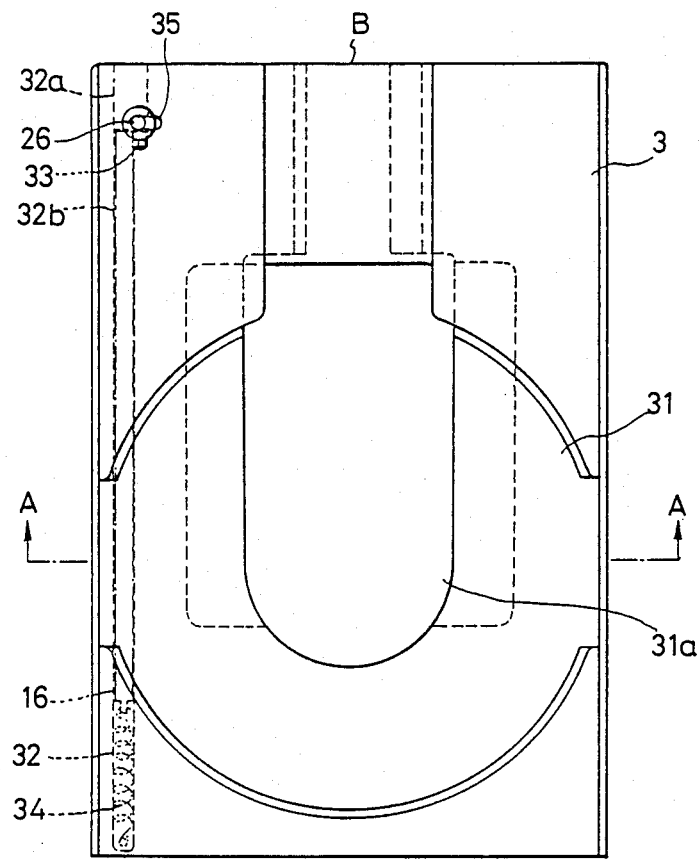
Figure 14:
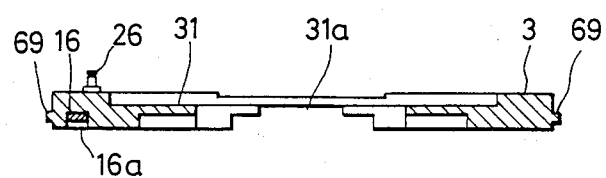
Figure 16:
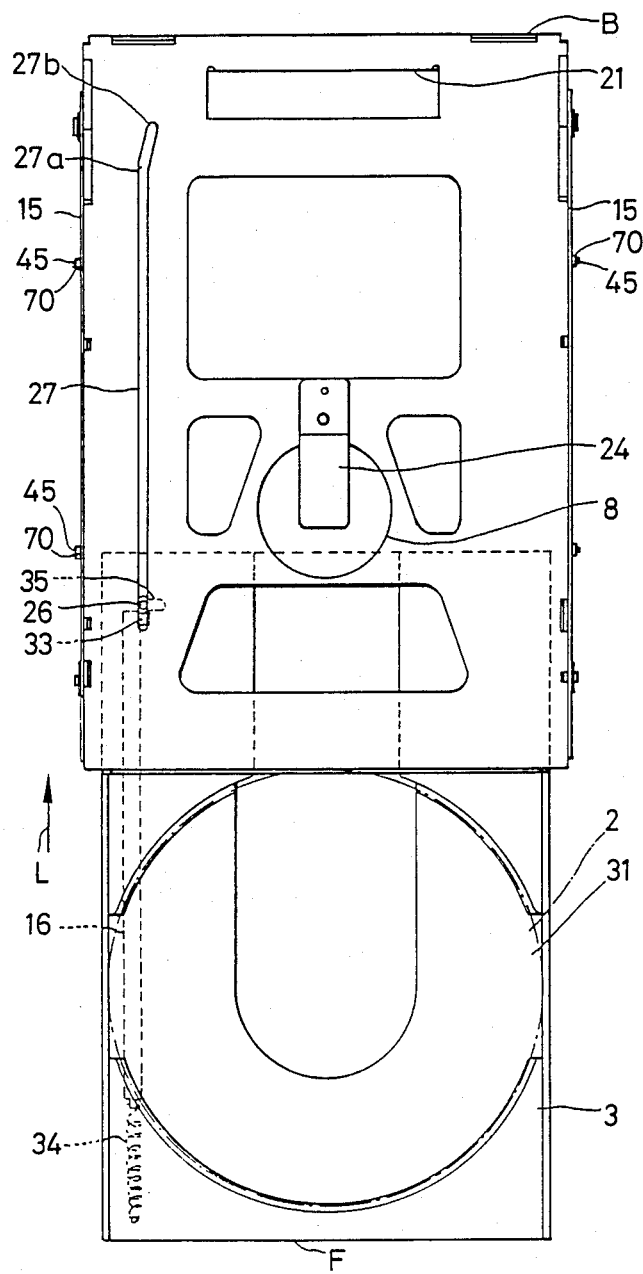
Figure 17:
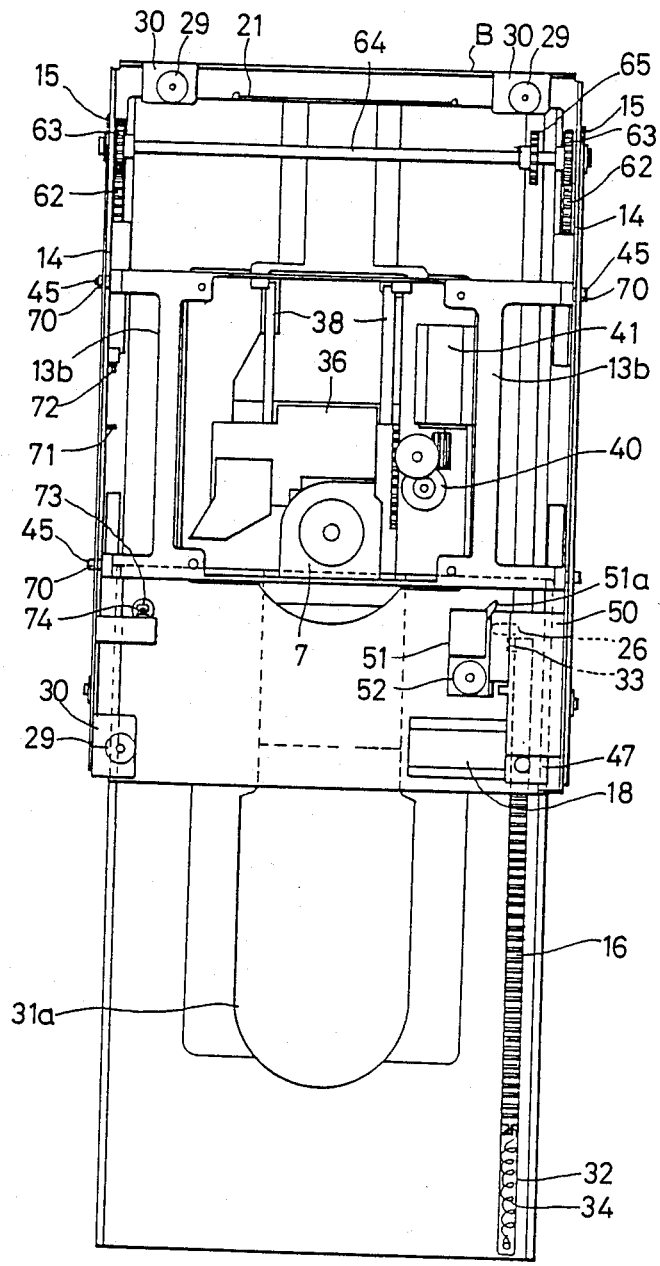
Figure 18:
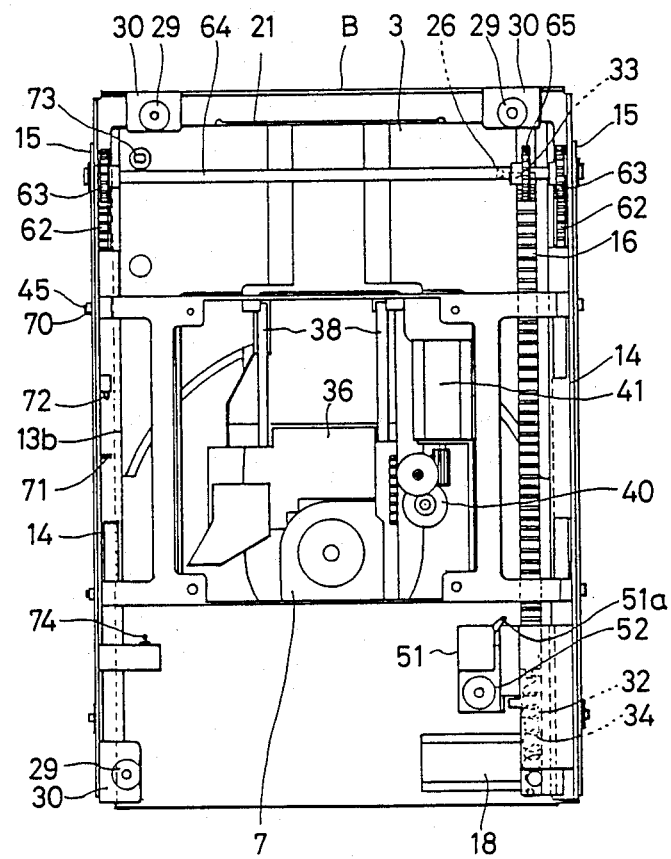
Figure 19:
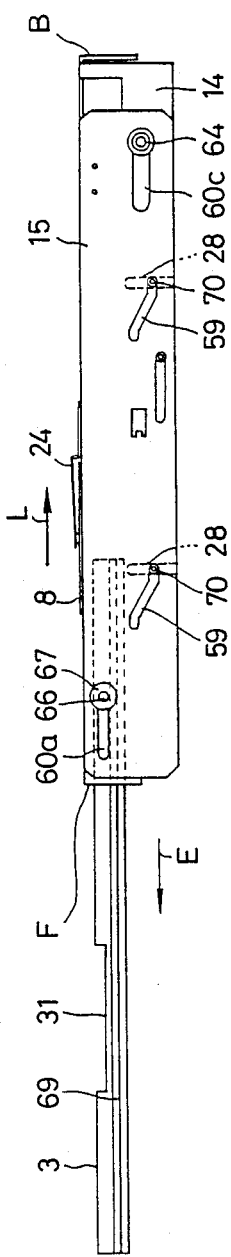
Figure 21:
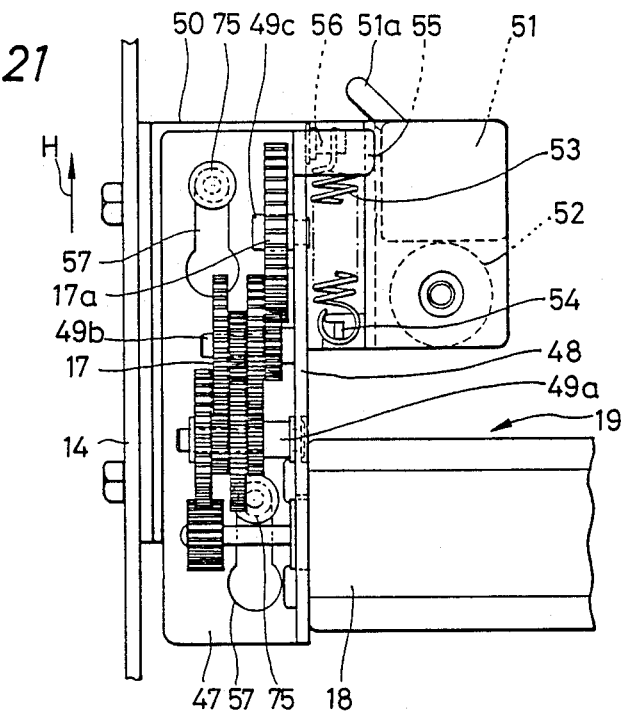
Figure 23:
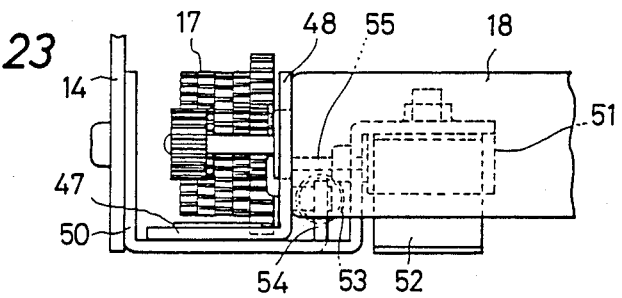
Figure 22:
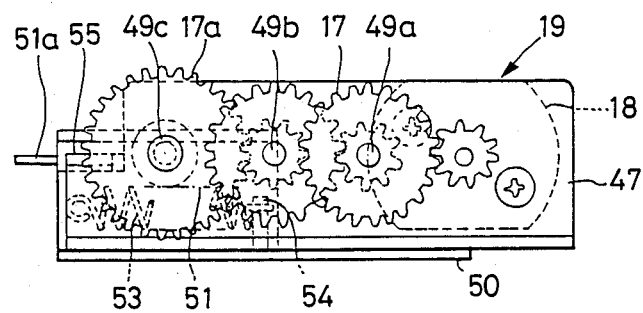
Figure 25:
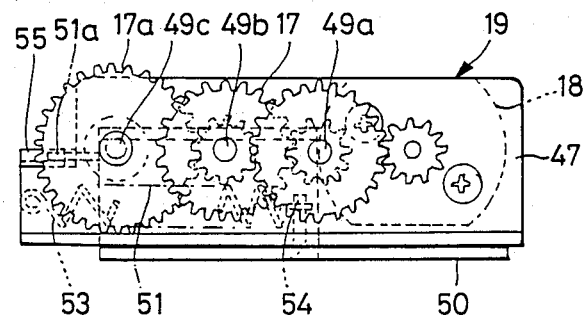
Figure 24:
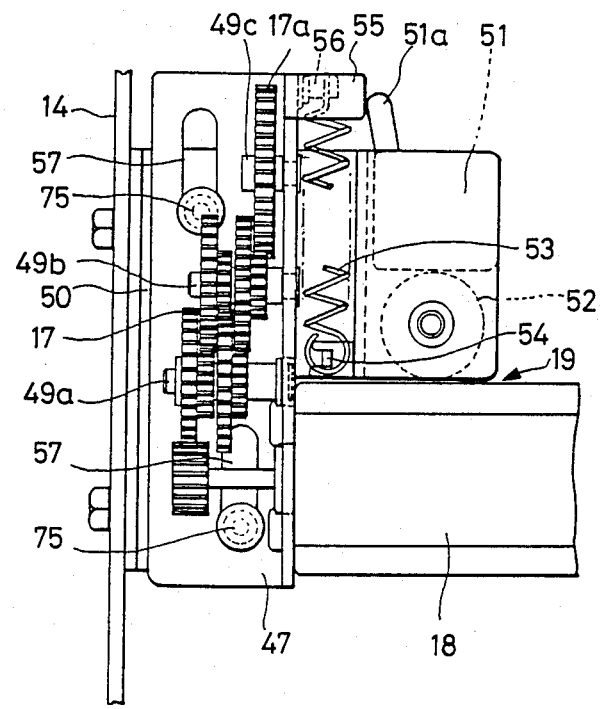
Figure 26:
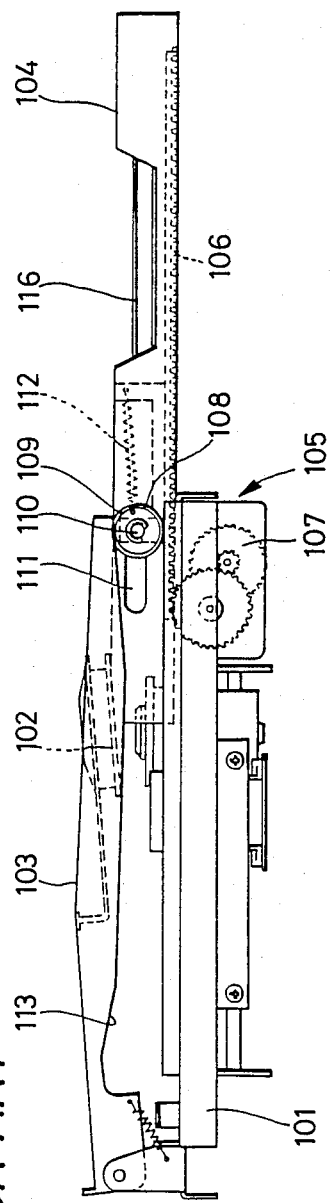
FIGS. 26 to 29 inclusive are views each showing an operation of an optical disk driving device of the prior art.
Figure 27:
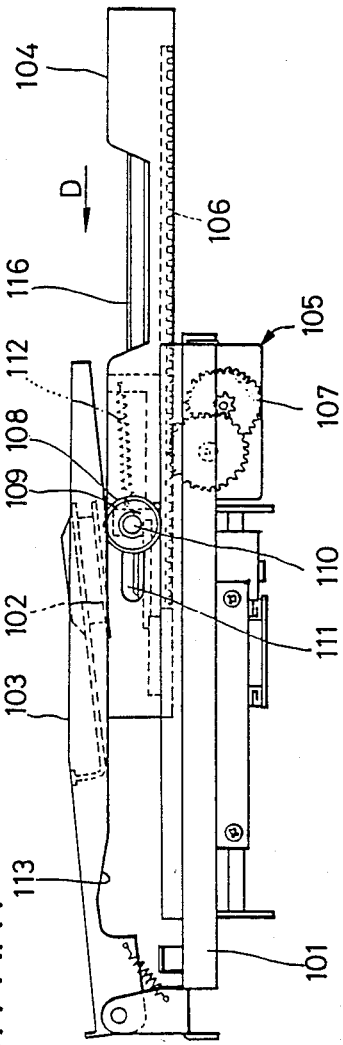
Figure 28:
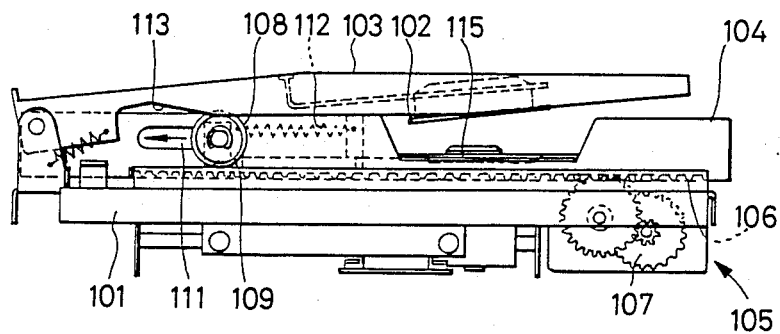
Figure 29:
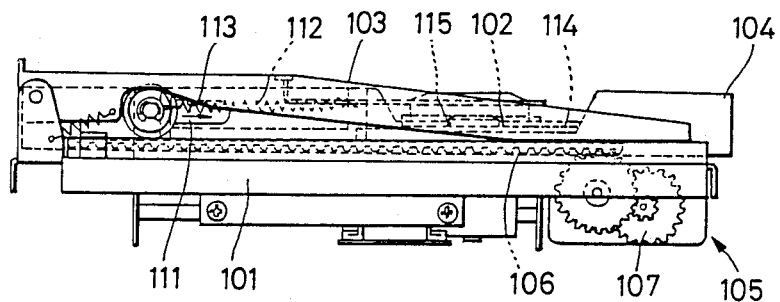

One embodiment of the present invention will hereinafter be described with reference to the accompanying drawings. FIGS. 1 to 25 in combination show an embodiment of the present invention. FIG. 1 is a plan view of an optical disk driving device when the loading is completed; FIG. 2 is a bottom plan view thereof; and FIG. 3 is a front view thereof. FIG. 4 is a front view of the optical disk driving device when a tray is at the loading position, while a small frame is at the unloading position. FIG. 5 is a side view of the optical disk driving device when the loading is completed. FIG. 6 is a plan view of the principal portion of the small frame; and FIG. 7 is a side view thereof. FIG. 8 is a plan view of a side base.; and FIG. 9 is a front view thereof. FIG. 10 is a plan view of a chasis; FIG. 11 is a front view thereof; and FIG. 12 is a side view thereof. FIG. 13 is a plan view showing a state in which the tray and the rack are incorporated. FIG. 14 is a sectional view taken substantially along the line A—A of FIG. 13. FIG. 15 is a front view of a lock pin. FIG. 16 is a plan view showing a pre-loading state wherein the tray protrudes from the chasis. FIG. 17 is a bottom plan view. FIG. 18 is a bottom plan view showing a state wherein the tray is drawn to the chasis and is at the loading position. FIG. 19 is a side view at an inject-time. FIG. 20 is a side view showing a state wherein the tray is led to the loading position. FIGS. 21 to 25 in combination show a motor unit: FIG. 21 is plan view when it operates in an ordinary manner; FIG. 22 is a side view thereof; FIG. 23 is a front view thereof; FIG. 24 is a plan view at the time of a switching operation; and FIG. 25 is a side view thereof. In the description that will hereinafter be made, the same companents as those shown in the example relative to the prior art or the components which are deemed identical therewith are marked with the same reference numerals.

In FIGS. 1 to 15 inclusive, an optical disk driving device 1 essentially consists of: a chassis 12; a tray 3; a small frame 13 including a frame 13a and a side base 13b projecting therefrom which frame 13a supports a turn table 6, a motor 7 by which to rotationally drive the turn table 6 and a pick-up 10; slide plates 15 disposed on both side surfaces of a side surface (side plate) 14 of the chassis 12; a rack 16 disposed on the lower surface of the tray 3 shown in FIG. 13; a motor unit 19 subsuming a gear train 17 meshing with the rack 16 and a motor 18 for rotationally driving the gear train 17; and a clamper 8 placed vis-a-vis with the turn table 6 disposed on the upper surface of the chassis 12.

The chassis 12 is, as illustrated in FIGS. 10, 11, formed by bending a metallic thin plate in a reversed U-shape in section the underside of which is open. In FIG. 10, a lead in-and-out port 20 (the side of the lead in-and-out port 20 is hereinafter referred to as a front portion F, while the other side opposite to this port is called a back portion B) for the tray 3 is provided at the lower portion. On the side of back portion B is vertically provided a stopper 21 for prescribing a final lead-in position of the tray 3. An insertion hole 23 for the clamper 8 and an installing portions 25 for installing clamp spring 24 which resiliently supports the clamper 8 are formed at the positions opposite to the aforementioned turn table 6 disposed on the upper plate 22 of the chassis 12. A guide groove 27 for guiding a lock pin 26 that will be mentioned later is formed on the left side when viewing from the side of the above-described lead in-and-out port 20 of the upper plate 22; and a slightly crooked portion 27a is provided on the side of back portion B. In this case, the arrangement is such that the position of the lock pin 26 is so set as to slightly deviate from the direction in which the tray is inserted.

Two guide grooves 28 which vertically extend from the open end of the underside to the upper plate 22 are, as illustrated in FIG. 12, formed in the side surface (hereinafter referred to as a side plate) 14 constituted by two pieces of side plates suspended from the upper plate 22 of the chassis 12. Installing portions 30 for rubber vibration insulators are provided on the side of the lead in-and-out port 20 for the tray 3 and on the side opposite thereto.

As shown in FIG. 13, the tray 3 includes a mounting portion 31 mounted with the optical disk 2 which is formed in a concave configuration in the middle portion of the upper surface thereof; and a turntable insertion hole 31a through which the turn table ascends in order to be inserted is formed in the central part. In the lower surface of the tray 3 is cut-formed a rack fitting groove 32 into which the rack 16 is slidably and loosely inserted, the rack 16 arranging for the tray 3 to be led to a predetermined loading position of the chassis 12 and to be sent out therefrom while interlocking with the tray 3.

The rack 16 is, as indicated by a dash-dot line of FIG. 13, provided with a projection 33 protruding sideways which is formed on the upside in the Figure, viz., on the side of the back portion B. Corresponding to this formation, the rack fitting groove 32 is provided with a large width portion 32a formed on the side of the back portion B of the tray 3, and the the projection 33 of the rack 16 is so set as not to move to the small width portion 32b. The rack 16 is constantly biased by a tensile spring 34 toward the front portion F of the tray 3 within the rack fitting groove 32. A lock pin insertion hole 35 through which a lock pin 26 that will be mentioned later is inserted is so formed in the tray 3 behind the projection 33 of the rack 16 as to be perpendicular to the rack fitting groove 32. A tooth-part 16a of the rack 16 is, as illustrated in FIG. 14, exposed to the lower surface of the tray 3.

As shown in FIG. 2, the small frame 13 consists of a frame member 13a and a side base 13b. The frame member 13a is, as depicted in FIS. 2, 6, 7, is equipped with the motor 7 for rotationally driving the turntable 6, a carriage 36 loaded with the pick-up 10 and a carriage driving mechanism 37 for transferring the pick-up 10 in the radial direction of the optical disk 2. the carriage driving mechanism 37 is constituted by: a couple of guide bars 38 for guiding the carriage 36; a gear train 40 engaging with a rack 39 formed on the side surface of the carriage 36; and a motor 41 by which to rotationally drive the gear train 40. These components are disposed on the lower surface of the frame member 13a. The side base 13b is, as shown in FIGS. 8, 9, formed in a substantially H-shape; and a pair of the side bases 13b are fitted in installation holes 43 of the frame member 13a in order to be fixed by screws, making the most of screw holes. By virtue of this formation, a projection 44 of the side base 13b assumes such a configuration that it stretches toward the side plate 14 of the chassis 12. The end surface of the projection 44 is formed with an installation hole 46 in which to fit a roller pin 45 which performs a function as a projection.

The motor unit 19 is, as illustrated in FIGS. 21 to 23 inclusive, composed mainly of: the motor 18 attached to a side plate 48 of the slide member 47 which takes an L-shape in section; the gear train 17 rotatably fitted to supporting spindles 49a, 49b, 49c which are vertically provided on the side plate 48; and a supporting plate 50 which slidably supports the slide member 47. To this supporting plate 50 are attached to a lever type switch 51 and a rubber vibration insulator 52. In addition, the supporting plate 50 is vertically provided with a stopping member 54. The slide member 47 subsumes an impingement member 55 which impinges upon a lever 51a of the switch 51 and a stopping member 56 which is protrusively provided thereon. A tensile spring 53 is spanned between the stopping members 54, 56. In such a formation, the slide member 47 is always biased in the lower direction (toward the front portion F) of FIG. 21, and the position thereof is prescribed by the guide groove 57 of the slide member 47.

As depicted in FIGS. 1, 5, the clamper 8 is elastically fitted to the upper plate 22 of the chassis 12 on the side of the turn table 6 so that the clamper 8 is rotatable at this installing position.

The lock pin 26 is, as illustrated in FIG. 15, formed with a collar 58 at its central portion; and the upper portion of this collar 58 protrudes toward the tray 3 such as to be freely fitted in the guide groove 27 formed in the upper plate 22 of the chassis 12, whereby the lock pin 26 moves along the guide groove 27.

A pair of slide plates 15 are prepared by ones on the outside of the side plate 14. As shown in the side view of FIG. 5, the slide plate 15 is formed with a cam groove 59 in which to fit the roller pin 45 provided at the tip end of the side base 13b of the small frame 13 and with guide grooves 60a, 60c for prescribing a horizontal position to the upper plate 22 of the chassis 12. The cam groove 59 is so formed as to be oblique upward to the front portion F of the chassis 12. The above-mentioned roller pin 45 moves along the inner surface of the cam groove 59 while coming in contact therewith in accordance with a reciprocatory motion of the slide plate 15. A small hole 61 bored in the upper portion on the side of the back portion B is designed for installing a slide plate driving rack 62 shown in FIG. 2.

A pinion 63 shown in FIG. 2 is in mesh with the slide plate driving rack 62. This pinion 63 is integrally fitted to a rotary spindle 64 which is to be inserted in the guide groove 60c on the side of the back portion B. To this rotary spindle 64 is likewise fitted a pinion 65 engaging with the foregoing rack 16.

The optical disk driving device 1 having the thus constructed components is, as illustrated in FIGS. 1, 3, 5, arranged such that the slide plate 15 installed through the intermediary of, for instance, an E washer 67 on the outer surface of the side plate 14 of the chassis 12 by means of the rotary spindle 64 and a pin 66, the slide plate 15 being slidable within a length of each of the guide grooves 60a, 60c.

A couple of guide rails 68 are disposed on the inner surface of the side plate 15 of the chassis 12 so that they extend from the lead in-and-out port 20 of the tray 3 to the back portion B. Small protrudent portions 69 provided on the side surfaces of the tray 3 are slidably inserted in the grooves formed in the guide rails 68, and the tray 3 is arranged to be capable of making only the reciprocatory motion along the guide rails 68.

Referring to FIG. 1, the above-described motor unit 19 is installed through the intermediary of the supporting plate 50 on the side plate disposed to the left when viewing from the front portion F so that the motor 18 is placed on the side of the front portion F, videlicet, on the side of the lead in-and-out port 20 of the tray 3 of the chasis 12. A gear 17a of the final stage of the gear train 17 of the motor unit 19 meshes with the rack 16, thereby driving the tray 3 and the slide plate 15. The small frame 13 is fitted through the intermediary of the roller pin 45 provided at the tip end of the side base 13b both in the guide groove 28 formed in the side plate 14 of the chasis 12 and in the cam groove 59, and is then retained between the slide plates 15. A roller 70 is rotatably attached to the tip end of the roller pin 45. With this configuration, it rolls in the cam groove 59, whereby the operational force of the slide plate 15 is lightened. According to the above-described constitution, the rack 16 is driven through the instrumentality of the motor 18; the tray 3 makes a reciprocatory motions; the small frame 13 can perform its acsending and descending motion; the pick-up 10 is transferred by the motor 41; and the optical disk 2 can rotationally be driven by the motor 7.

The operations relative to the recording medium driving device according to the present invention will hereinafter be described at full length.

Referring to FIGS. 16, 17 and 19, there is shown a state in which the tray 3 is led out from the chassis 12, and the optical disk 2 is mounted on the mounting portion 31. In this state, when turning ON a loading switch provided on the side of a control unit (not illustrated), the motor 18 rotates thereby to revolve the gear train 17. At this time, the gear 17a of the final stage is rotationally driven in the direction indicated by an arrowhead L. Inasmuch as the end portion formed with the projection 33 of the rack 16 impinges upon the lock pin 26 inserted in the rectilinear portion of the guide groove 27 so that the same end portion is positioned on the left side of a lock pin insertion hole 35 in FIG. 16, the driving force acting in the direction pointed by the arrowhead L which force is applied to the rack 16 is propagated via the lock pin 26 to the tray 3. Subsequently, the tray 3 moves in the direction indicated by the arrowhead L together with the rack 16 and is then led to the chassis 12. In this example, the tray 3 is driven via the lock pin 26. However, the lock pin 26 may be omitted. Instead, a spring constant of the tensile spring 34 has to be set properly.

When the tray 3 moves in the direction pointed by the arrowhead L and the lock pin 26 reaches a crooked portion 27a of the guide groove 27, the lock pin 26 is guided by the crooked portion 27a, thereby moving the lock pin insertion hole 35 to the right hand. At this time, the end portion of the projection 33 still impinges upon the lock pin 26; and the tray 3 integral with the rack 16 shifts to the predetermined position shown in FIGS. 18, 20. After reaching the loading position, the lock pin 26 arrives at a terminal 27b of the crooked portion 27a, whereby it is situated at the right end portion of the lock pin insertion hole 35. At this time, the small frame 13 is, as illustrated in FIG. 4, still positioned at the lower portion of the chassis 12 and is in the unloading state with respect to the optical disk 2. When the lock pin 26 is positioned at the right end portion of the lock pin insertion hole 35, as depicted in FIG. 18, the projection 33 of the rack 16 impinges upon the lock pin 26, thus releasing the locking state. At this position, the tray 3 butts against a stopper 21 of the chassis 12, whereby the tray 3 becomes incapable of moving. Consequently, the rack 16 alone further moves in the direction pointed by the arrowhead L, resisting the resilient force of the tensile spring 34.

On the occasion of releasing the locking state of the rack 16, the rack 16 commences its movement, at which time the rack 16, as shown in FIG. 18, engages with the pinion 65 to integrally rotate the rotary spindle 64. Upon a rotation of the rotary spindle 64, the pinions 63 that are axially fitted to both ends of the rotary spindle 64 rotate integrally, thereby causing the slide plate driving rack 62 with which the pinions 63 engage to move in the same direction indicated by the arrowhead L as the moving direction of the rack 16. The slide plate driving rack 62 is integrally provided on the slide plate 15 and hence the slide plate 15 moves from the position shown in FIG. 20 to the position depicted in FIG. 5 in the direction of the arrowhead L.

When the slide plate 15 shifts in the direction pointed by the arrowhead L, a roller 70 of the roller pin 45 protruding from the small frame 13 is pushed in an obliquely upper direction with the help of the cam groove 59. Since this roller 70 is also inserted in the guide groove 28 formed in the side plate 14 of the chassis 12, the roller 70 is pushed up toward the upper plate 22 of the chassis 12 along the guide groove 28 in the course of coming in contact with the cam groove 59. Concomitantly, the small frame 13 is raised toward the clamper 8. In the process of its ascent, the turn table 6 pushes up the optical disk from the underside to the clamper 8. When the roller 70 reaches the upper end of the cam groove 59, the optical disk 2 is sandwiched by dint of the resilient force of a clamper spring 24 between the clamper 8 and the turn table 6 in a state wherein it is spaced from the mounting portion 31 of the tray 3.

When coming exactly to this position, as shown in FIG. 2, the projection jutting out from the slide plate 15 to the chassis 12 butts against a sensor 72. Thereupon, the rotation of the motor 18 halts in response to signals transmitted from the sensor 72, and the situation shown in FIG. 4 changes to the one illustrated in FIG. 3, thereby completing the loading operation of the optical disk 2. In the wake of this, the motor 7 is rotated by pushing a play button, and at the same time a motor 41 for a carriage transfer mechanism 37 is driven. Subsequently, the pick-up 10 is transferred to a desired track position where the recording or reproduction is effected.

After the recording or the reproduction has been performed, and when turning ON an inject-switch provided on the side of the control unit (not illustrated), the motor 18 rotates in the reversed direction of that of the loading time. Owing to this process, the rack 16 moves in the direction indicated by an arrowhead E. The slide plate driving rack 62 is made to shift in the direction pointed by the arrowhead E through the intermediary of the pinions 65, 63 by inversely performing the above-described operations. Thereafter, the slide plate 15 also moves back in the direction pointed by the arrowhead E so as to be concomitant with the movement of the slide plate driving rack 62; and the small frame 13 also descends by making the roller pin 45 and the roller 70 respectively engage with the cam grooves and the guide groove 28, thus returning to the initial position. Upon a descent of the small frame 13, as a mater of course, the turn table 6 goes down and retreats to the lower surface of the tray 3 while letting the optical disk 2 remain on the mounting member of the tray 3.

At this time, the projection 33 of the rack 16 impinges upon an end surface 32c formed on the side of a small width portion 32b of the large width portion 32a of the rack fitting groove 32, the tray 3 begins to move in the direction pointed by the arrowhead E together with the rack 16. If the tray 3 is protruded up to the position shown in FIG. 17 by the driving force of the motor 18, a pin 73 which is perpendicularly provided on the lower surface of the tray 3 butts against the sensor 74, and the motor 18 stops in response to the signals sent from the sensor 74, thus terminating the inject-operation. At this position, it is feasible to take the optical disk 2 out of the tray 3.

On the occasion of performing the inject-operation, however, it can be considered that the tray 3 which is on the point of being injected from the chassis 12 impinges upon any obstacles including a human body. Given that the tray 3 butts against an obstacle, the driving force acting in the direction of the arrowhead E is applied from the motor 18 to the tray 3, with the tray 3 halting, or with a push-in force applied to the chassis 12. Under such circumstances, there is a probability to cause some troubles such as over-heat of the motor 18, incomplete engagement of the rack 16 and the gear 17a and breakage or incomplete engagement of the gears of the gear train 17. In the worst case, a loading inject incapable state is likely to be created.

With a view to avoiding this situtation, there is employed the motor unit 19 having the above-described constituion for the optical disk driving device according to the present invention. Videlicet, this motor unit 19 is formed such that the slide member 47 equipped with the gear train 17 engaging with the rack 16 and with the motor 18 for driving the gear train 17 is, as illustrated in FIG. 21, so fitted to the supporting plate 50 as to be slidable by at least a length of the guide grrove 57; and the supporting plate 50 is attached to the side plate 14 of the chasis 12. As explained ealier, the tensile spring 53 is spanned between the supporting plate 50 and the slide member 47. In an ordinary time, the end portion, situated on the side of the back portion B, of the guide groove 57 impinges upon the pin 75 fixed to the supporting plate 50. In such a state, an impingement member 55 of the slide member 47 retreats to a position at which a lever 51a of a switch 51 is never operated.

When the gear 17a of the final stage injects the tray 3 by engaging with the rack 16 in the above-described state, and supposing that the tray 3 butts against any obstacle, the movement of the tray 3 ceases, and the rack 16 of course stops moving. However, the motor 18 keeps on rotating without any interruption. When the rack is in an unmovable state, the motor 18 rotates, in which case the rotary force of the motor 18 works such as to move the gear 17a in the direction along the tooth-portion 16a of the rack 16 in conformity with the law of action and reaction. Due to this process, the gear train 17 and the slide member 47 which retains the motor 18 move in the direction pointed by an arrowhead H while resisting the resilient force of the tensile spring 53. Thereupon, the impingement member 55, as shown in FIGS. 24, 25, causes the lever 51a of the switch 51 to rotate clockwise in the Figures. The switch 51 detects this rotation of the lever 51a thereby to change over the contact point in order to reverse the rotation of the motor 18. Upon a rotational reversion of the motor 18, the tray 3 moves in the inject-direction, that is, from the arrowhead E to the arrowhead L, viz., in the loading direction, thereby preventing the occurrence of the aforementioned troubles.

The lock pin 26 surely carries out the lead-in operation of the tray 3 and is designed for preventing a malfunction between the lead-in operation and the ascending motion of the small frame 13.

Namely, if the optical disk driving device 1 be constructed without a lock means like the lock pin 26 for the rack 16, and when the manipulator stops the tray 3 or moves it back, for instance, by hand in time of the tray 3 shifting in the loading direction, the rack 16 alone moves in the direction of the arrowhead L, resisting the resilient force of the tensile spring 34. When the rack 16 comes to the position at which to engage with the aforegoing pinion 65, the slide plate 15 is made to move by driving the pinion 63, at which time the tray 3 does not yet reach the loading position. Nevertheless, the small frame 13 goes up by virtue of the movement of the slide plate 15. For this reason, there will exist a undesirable situation wherein the turn table 6 impinges upon the recording region of the optical disk 2 to such an extent that the turn table 6 presses it thereby to damage the recorded information, or it butts partially against the tray 3 and breaks it.

Provided that the tensile spring 34 is deteriorated and the specified resilient force can not certainly be obtained, only the rack 16 is led in at the loading time, and the small frame 13 is raised in spite of the fact that the tray 3 does not yet arrive at the loading position. This will probably bring about the above-mentioned troubles.

However, if it is constituted such that the above-described lock pin 26 is led in, and after the tray 3 has reached the preset loading position, the lock pin 26 is unlocked, there is absolutely no possibility to produce the malfunction. Furthermore, it is feasible to avoid such an accident that the optical disk 2 and the tray 3 are damaged. The lock pin 26 locks the rack 16 at the large width portion 32a of the rack fitting groove 32 formed in the tray 3 and is simply arranged to be loosely inserted in the guide groove 27 and in the lock pin insertion hole 35 by combining them so that the tray 3 comes off the end portion of the rack 16 when reaching the loading position. Hence, the cost of production is inexpensive, and the operations are invested with certainty.

As explained earlier, according to the foregoing embodiment, there are yielded the following effects.

(1). A mechanism for descending a sub-tray 4 of the tray 3 and a mechanism for pressing the optical disk 2 by suppoting the clamper 8 in a swayable manner become unnecessary, and it is therefore possible to further reduce the optical disk driving device 1 in thickness.

(2). The lock pin 26 is led in, and the integral and seaparate operations with respect to the rack 16 and the tray 3 are exactly prescribed, so that there is no probability to cause the malfunction; and no damage is likely to be exerted on the recording medium and the optical disk driving device because of the malfunction. Owing to these advantages, it is feasible to enhance the trustworthiness in the optical disk driving device.

(3). Since the detection controlling means for mechanically detecting the troubles which occur at the inject-time of the tray 3 and for inverting the tray 3 in the loading direction is constituted by the mechanical motor unit 19, it is possible to decrease the cost of manufacturing the optical disk driving device.

As can be clarified from the description so far made, according to the present invention, there are equipped the lock member for locking the tray and the rack that are integrally movable and the guide groove defined as the releasing means for releasing the above-described locking state when the tray is led to the loading position, it is feasible to prevent a malfunction from occuring at the loading time in the recording medium driving device of the front loading type and to enhance the trustworthiness in this device, inasmuch as the integral and separate operations relative to the rack and the tray can exactly be prescribed.

As many apparently widely different embodiments of this invention may be made without departing from the spirit and scope thereof, it is to be understood that the invention is not limited to the specific embodiments thereof except as defined in the appended claims.

What is claimed is:

1. A recording medium driving device having:
    a chassis;
    a tray for mounting an information recording medium;
    means for driving said information recording medium, said driving means being located in said chassis;
    a rack interlocking with said tray; and
    a tray moving means including gears that are in mesh with said rack, so as to lead the information recording medium mounted on said tray from outside said chassis onto said driving means at a loading position of said rack and said tray within said chassis;
    the improvement comprising:
       said tray moving means including a lock member for locking said rack to said tray into a locking state and so as to move said rack and said tray to the loading position; and a first guide groove for guiding said lock member and said rack and said tray to said loading position and for guiding said lock member to a position at which said locking state between said rack and said tray is completely released after reaching said loading position.

2. A recording medium driving device as set forth in claim 1, wherein said tray has a lower surface formed with a second groove in which said rack is slidably inserted.

3. A recording medium driving device as set forth in claim 1, wherein said rack is provided with projections on both ends thereof.

4. A recording media driving device as set forth in claim 1, wherein said first guide groove includes an offset crooked portion through which said lock member is guided, said rack being movable with respect to said tray when said lock member reaches a terminal portion of said offset crooked portion.

5. A recording medium driving device as set forth in claim 1, further comprising a small frame movable in a vertical plane with respect to said tray and wherein said lock member is designed so as to surely lead the information recording medium mounted on said tray outside said chassis onto said driving means within said chassis, and wherein said lock member is also designed so as to prevent a malfunction whereby the movement of the small frame in the vertical plane interferes with movement of said tray.

* * * * *